US009200626B2

(12) United States Patent
Park

(10) Patent No.: US 9,200,626 B2
(45) Date of Patent: Dec. 1, 2015

(54) HIGH PRESSURE FUEL PUMP HAVING IMPROVED LUBRICATION CHARACTERISTICS

(71) Applicant: Hyundai Motor Company, Seoul (KR)

(72) Inventor: Yongsoon Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 413 days.

(21) Appl. No.: 13/707,021

(22) Filed: Dec. 6, 2012

(65) Prior Publication Data

US 2014/0064993 A1 Mar. 6, 2014

(30) Foreign Application Priority Data

Sep. 5, 2012 (KR) ........................ 10-2012-0098123

(51) Int. Cl.

*F16J 1/10* (2006.01)
*F04B 17/05* (2006.01)
*F02M 59/10* (2006.01)
*F04B 1/04* (2006.01)
*F04B 53/18* (2006.01)

(52) U.S. Cl.

CPC .............. *F04B 17/05* (2013.01); *F02M 59/102* (2013.01); *F04B 1/0426* (2013.01); *F04B 53/18* (2013.01); *F02M 2200/02* (2013.01)

(58) Field of Classification Search

CPC ...... F04B 1/0426; F04B 1/0439; F04B 9/042; F04B 39/0276; F04B 53/18; F02M 59/102; F02M 2200/02

USPC ........................................... 92/129, 153, 154

See application file for complete search history.

(56) References Cited

U.S. PATENT DOCUMENTS

| | | | | |
|---|---|---|---|---|
| 6,216,583 | B1 * | 4/2001 | Klinger et al. | 92/129 |
| 6,951,165 | B2 * | 10/2005 | Kuhn et al. | 92/129 |
| 7,308,849 | B2 * | 12/2007 | Schoetz et al. | 92/129 |
| 7,497,157 | B2 * | 3/2009 | Aoki et al. | 92/129 |

FOREIGN PATENT DOCUMENTS

| | | | |
|---|---|---|---|
| JP | 3-85366 | A | 4/1991 |
| JP | 5-332222 | A | 12/1993 |
| JP | 2001-221131 | A | 8/2001 |
| JP | 2003-184699 | A | 7/2003 |
| JP | 2009-97517 | A | 5/2009 |
| JP | 2010-533818 | A | 10/2010 |
| KR | 2003-0077337 | A | 10/2003 |
| KR | 10-2005-0042081 | A | 5/2005 |

* cited by examiner

*Primary Examiner* — Michael Leslie

(74) *Attorney, Agent, or Firm* — Morgan, Lewis & Bockius LLP

(57) ABSTRACT

A high pressure fuel pump with improved lubrication characteristics includes a plunger configured to pressurize fuel supplied to a high pressure chamber formed within a housing at a high pressure to discharge the fuel while being lifted and dropped in the high pressure chamber within the housing, a tappet body configured to support a lower end of the plunger, a cam configured to lift and drop the plunger while rotating, and a roller configured to be installed in a roller shoe pressed in a lower portion of the tappet body and rotate in a state of being in contact with the cam, the fuel supplied to the high pressure chamber passes the roller shoe through at least one lubrication passage and is supplied to a contact area between the roller and the cam or a contact area between the roller shoe and the roller.

8 Claims, 6 Drawing Sheets

HIGH PRESSURE FUEL PUMP HAVING IMPROVED LUBRICATION CHARACTERISTICS

CROSS-REFERENCE TO RELATED APPLICATIONS

The present application claims priority of Korean Patent Application Number 10-2012-0098123 filed Sep. 5, 2012, the entire contents of which application is incorporated herein for all purposes by this reference

BACKGROUND OF INVENTION

1. Field of Invention

The present invention relates to a high pressure fuel pump applied to a common rail system of a diesel engine; and, particularly, to a high pressure fuel pump of which an inner portion is formed with a lubrication passage in which fuel flows to allow components in the high pressure fuel pump to be lubricated, thereby having improved lubrication characteristics.

2. Description of Related Art

A common rail system mounted to a diesel engine is provided with a high pressure fuel pump into which fuel primarily pressurized by a low pressure fuel pump is introduced from a fuel tank and from which the introduced fuel is discharged by being secondarily pressurized at a high pressure of 2000 bar or more.

A schematic structure of such a high pressure fuel pump is described with reference to FIG. 1. The high pressure fuel pump includes a housing 110 having an inlet 111 and an outlet 112, a cam shaft 120 which is rotatably provided within the housing 110 and formed with a cam 121, a plunger 130 which is lifted by rotation of the cam shaft 120 to pressurize the fuel, a tappet body 131 to support a lower end of the plunger 130, and a roller 142 provided between the tappet body 131 and the cam 121.

When the cam shaft 120 rotates, the plunger 130 pressurizes the fuel, which is introduced into a high pressure chamber formed within the housing 110 through the inlet 111, at a high pressure to discharge the fuel to the outlet 112 while being lifted and dropped along at least one cam 121 formed around the cam shaft 120.

In this case, the roller 142 is mounted to a roller shoe 141 pressed in the tappet body 131 and is maintained in a state of contact with the cam 121 during the rotation of the cam shaft 120, to thereby reduce friction between the cam 121 and the roller shoe 141.

However, the roller 142 is always in contact with the cam 121 by the tappet body 131 supported by a spring 132, and moreover is inserted in a state of keeping a certain clearance with the roller shoe 141.

According to the structure of the high pressure fuel pump 100 of the related art, the fuel serving as a lubricant is not sufficiently supplied to a clearance between the roller 142 and the roller shoe 141 indicated by “A” in FIGS. 2 and 3 in which the roller 142 comes into contact with the roller shoe 141 and a contact portion between the roller 142 and the cam 121 indicated by “B” in FIGS. 2 and 3, thereby not causing smooth lubrication action. That is, the roller 142 is in surface contact with the roller shoe 141 on a portion indicated by “A”, and the roller 142 is in line contact with the cam 121 on a portion indicated by “B”. Accordingly, there is a problem in that the roller 142, the roller shoe 141, or the cam 121 is worn out or burned on the contact surface between the roller 142 and the roller shoe 141 and on the contact portion between the roller 142 and the cam 121 depending on these operations.

Therefore, the fuel serving as a lubricant needs to be sufficiently supplied in order to reduce friction on the contact surface and the contact portion. If the lubrication is abnormal, the cam 121 of the cam shaft 120, the roller 142, and the roller shoe 141 are worn out. Moreover, in the worst case, a fatal failure such as burning of the high pressure fuel pump 100 is caused.

In particular, the roller 142 mounted within the roller shoe 141 is kept at a minimal clearance. Hence, in a case where the lubrication is not smooth, abrasion between the roller 142 and the roller shoe 141 may be immediately caused.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a high pressure fuel pump having improved lubrication characteristics which forms a plurality of lubrication passages through which fuel is supplied to a tappet body and a roller shoe so that the fuel serving as a lubricant may be sufficiently supplied around a roller installed to come into contact with a cam of a rotating cam shaft in the high pressure fuel pump.

Various aspects of the present invention provide for a high pressure fuel pump having improved lubrication characteristics includes a plunger configured to pressurize fuel supplied to a high pressure chamber formed within a housing at a high pressure to discharge the fuel while being lifted and dropped in the high pressure chamber within the housing, a tappet body configured to support a lower end of the plunger, a cam configured to lift and drop the plunger while rotating, and a roller configured to be installed in a roller shoe pressed in a lower portion of the tappet body and rotate in a state of being in contact with the cam, the fuel supplied to the high pressure chamber passes the roller shoe through at least one lubrication passage and is supplied to a contact portion between the roller and the cam, a contact surface between the roller shoe and the roller, or the contact portion and the contact surface.

The lubrication passage may be formed of a communication hole which is formed by removing a partial section of a tappet body inner flange formed toward a center of the tappet body in an inner side surface of the tappet body, and a clearance formed between an outer side surface of the roller shoe which is located downward of the communication hole and fitted into a lower portion of the tappet body inner flange and the inner side surface of the tappet body, and the fuel may be supplied to the contact portion between the roller and the cam through the communication hole and the clearance.

The communication hole may be plural in number.

The communication holes may be formed at intervals of 180 degrees and formed in a direction perpendicular to a longitudinal direction of the roller.

An oil supply groove may be formed to be recessed at a portion in which the inner side surface of the tappet body abuts against the tappet body inner flange.

The lubrication passage may be formed of a roller shoe through hole which is formed to be penetrated in an upward and downward direction of the roller shoe, thereby allowing the fuel to be supplied from upward to downward of the roller shoe, and the fuel may be supplied to the contact surface between the roller and the roller shoe through the roller shoe through hole.

The roller shoe through hole may be formed from an upper surface of the roller shoe up to the contact surface between the roller shoe and the roller pressed in an inner portion of the roller shoe.

The roller shoe through hole may be one or more.

The roller shoe through hole may be arranged in a longitudinal direction of the roller.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

A high pressure fuel pump having improved lubrication characteristics in accordance with various embodiments of the present invention has a structure similar to the high pressure pump described in the related art. In the high pressure fuel pump, fuel supplied to a high pressure chamber passes a roller shoe 41 through at least one lubrication passage and is supplied to a contact portion between a roller 42 and a cam 121 and a contact surface between the roller shoe 41 and the roller 42.

Figure 1:
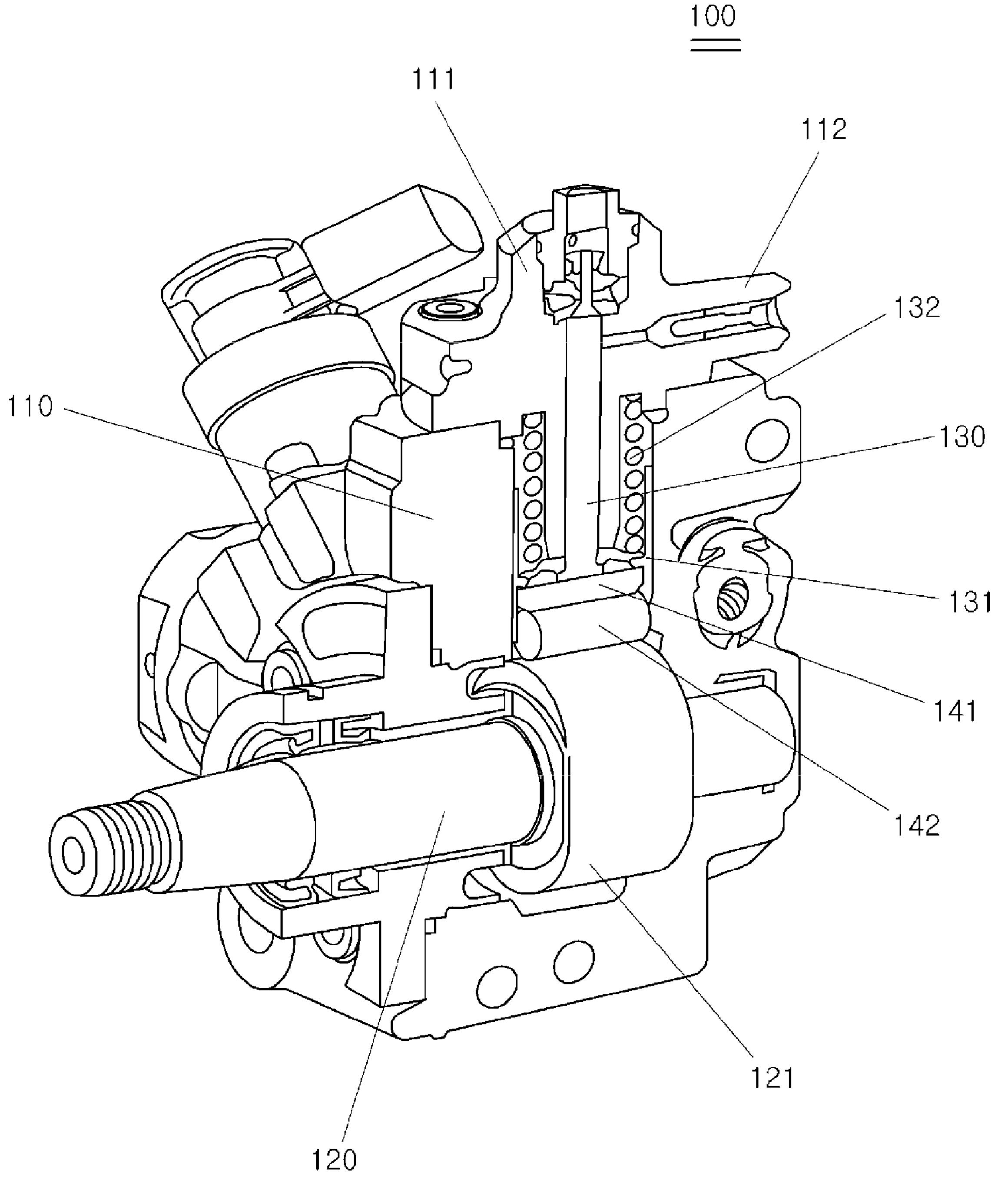
FIG. 1 is a cutaway perspective view illustrating a structure of a high pressure fuel pump in accordance with the related art.
Figure 2:
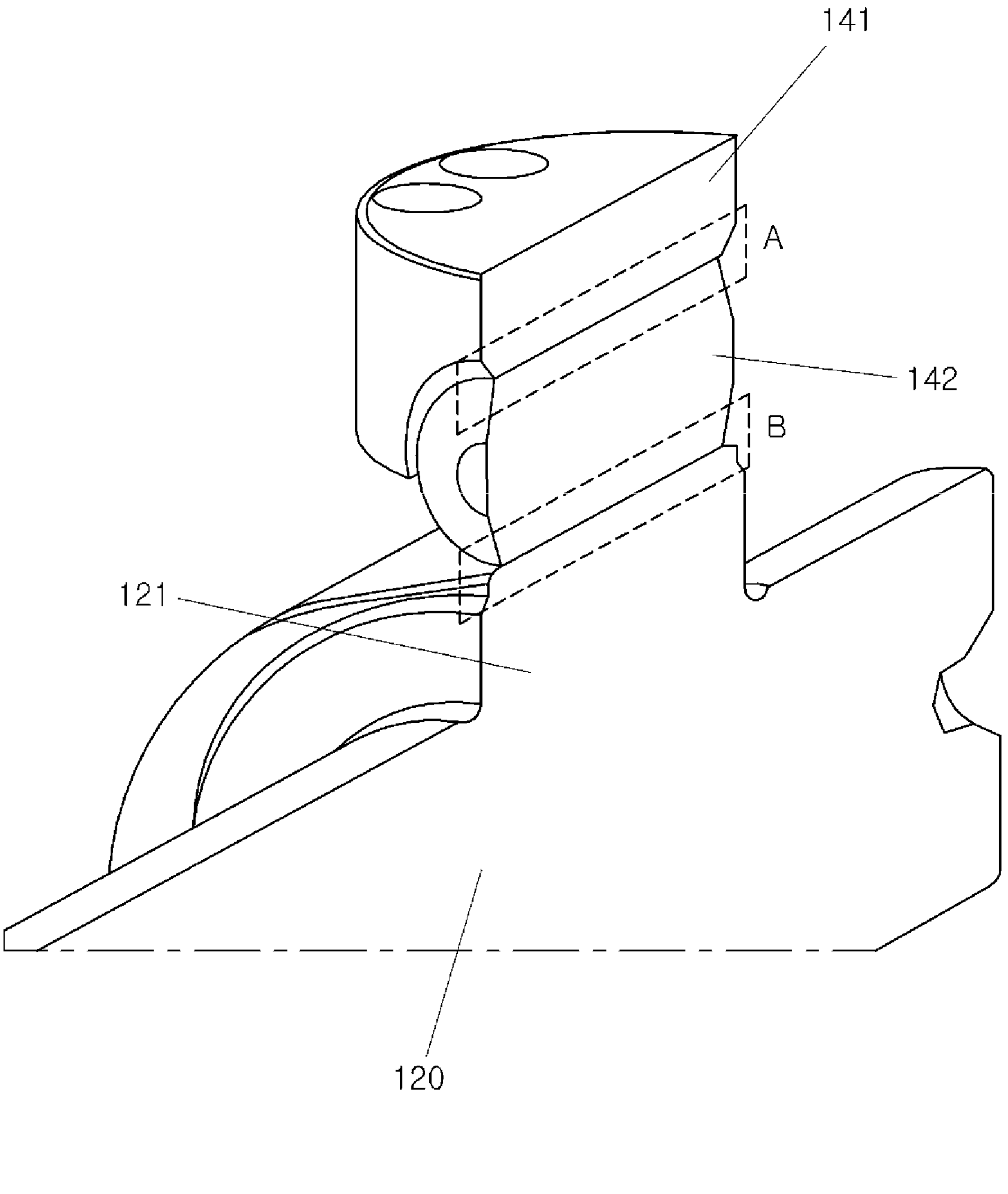
FIGS. 2 and 3 are a cutaway perspective view and a cross-sectional view illustrating a drive area in the high pressure fuel pump in accordance with the related art.
Figure 3:
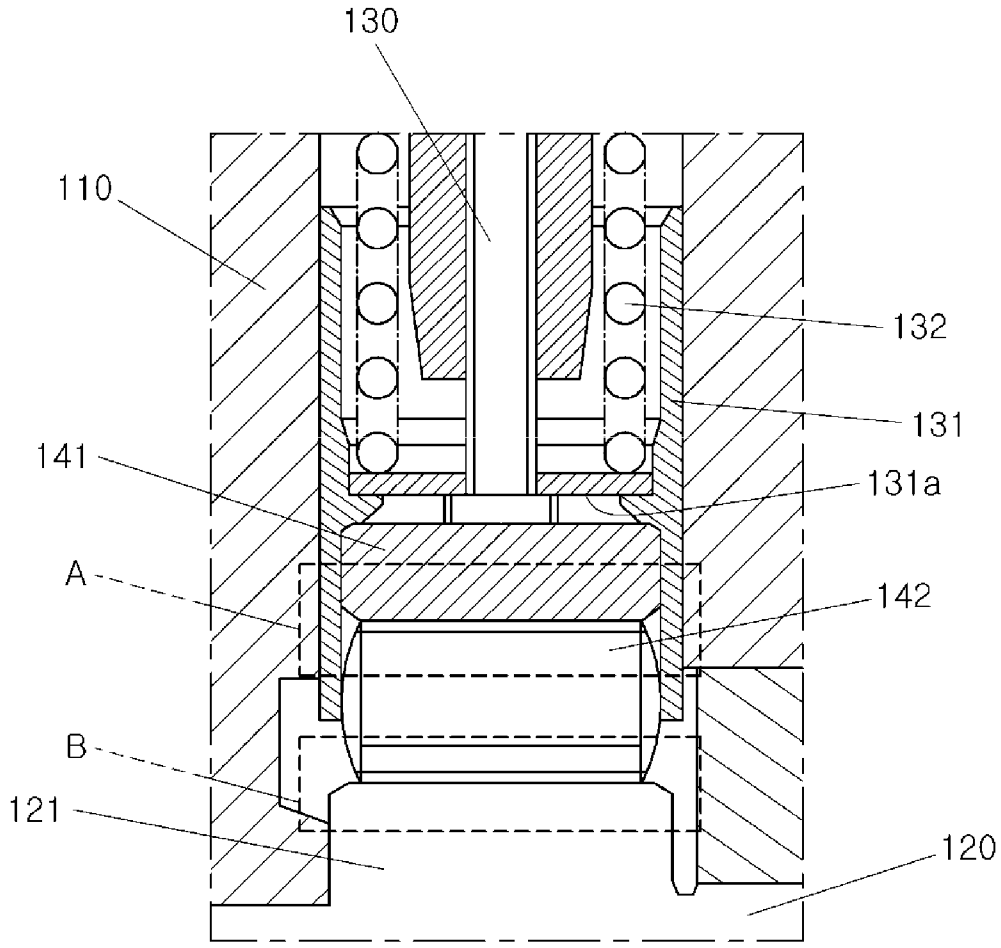
Figure 4:
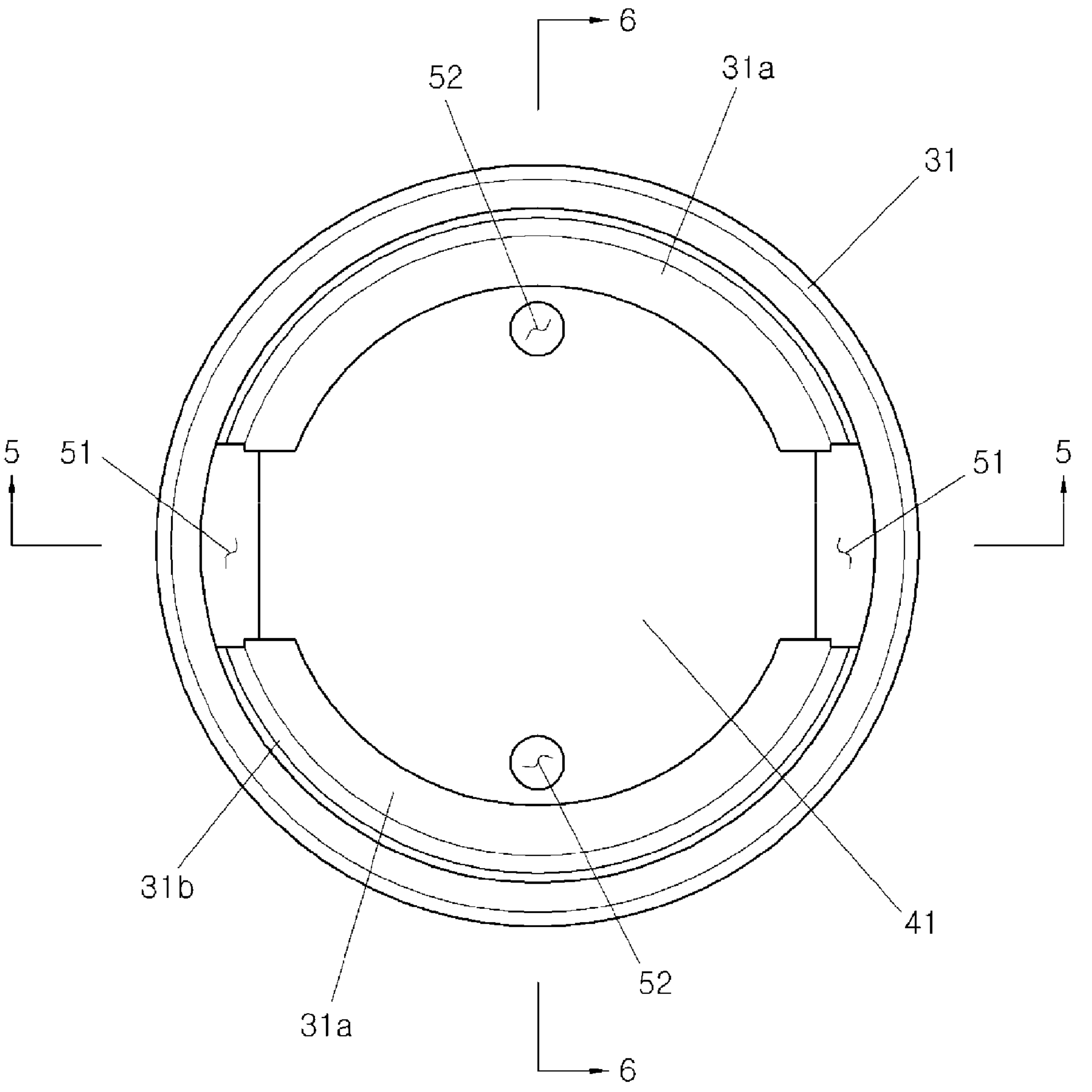
FIG. 4 is a plane view illustrating an assembly of a tappet body, a roller shoe, and a roller applied to an exemplary high pressure fuel pump having improved lubrication characteristics in accordance with the present invention.

As shown in FIG. 4, the lubrication passage is a communication hole 51 through which the fuel supplied to the high pressure chamber formed within a housing 110 of the high pressure fuel pump 100 is supplied to the contact portion between the roller 42 and the cam 121 or a roller shoe through hole 52 through which the fuel is supplied to the contact surface between the roller shoe 41 and the roller 42.

Figure 5:
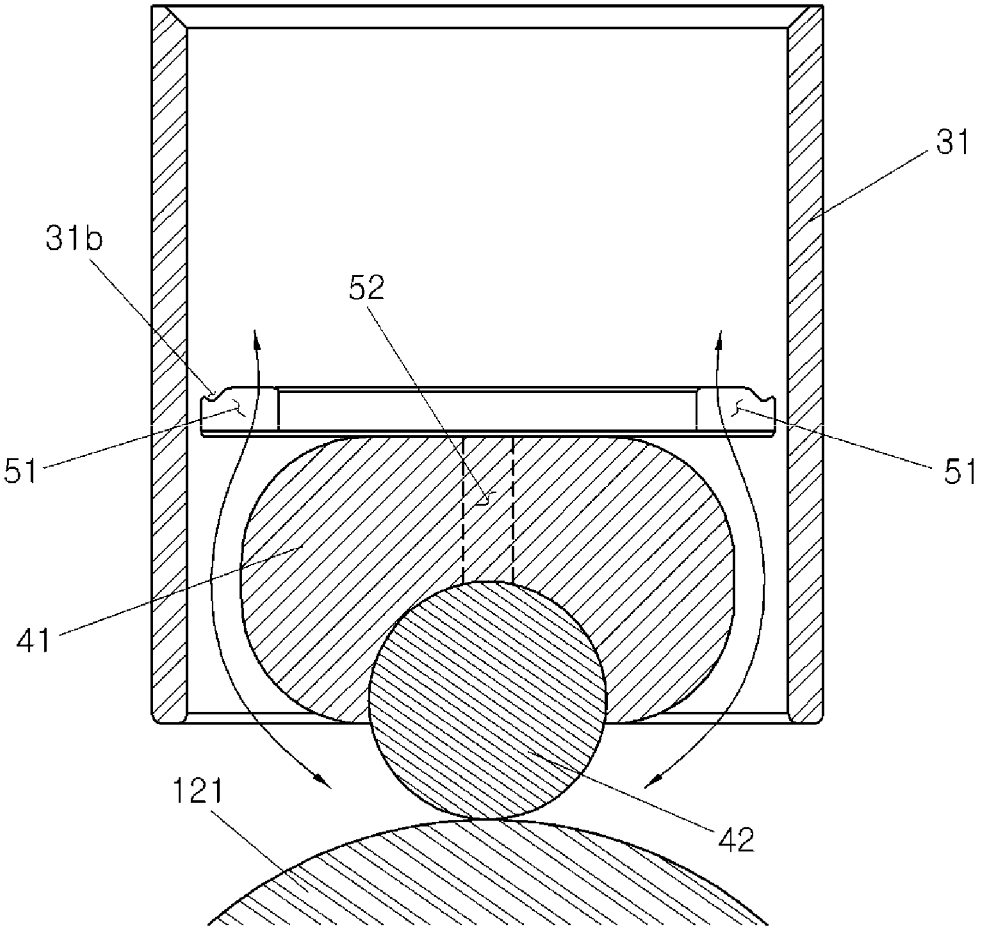
FIG. 5 is a cross-sectional view taken along line 5-5 in FIG. 4 for explaining a lubrication passage in the high pressure fuel pump having improved lubrication characteristics in accordance with the present invention.

As shown in FIG. 5, the lubrication passage may be a passage through which the fuel serving as a lubricant passes through opposite side surface of the roller shoe 41 to be supplied to the contact portion between the roller 42 and the cam 121.

An inner peripheral surface of a tappet body 31 is formed with a tappet body inner flange 31*a* so that a spring seat 131*a* to support a lower end of a spring 132 may be installed. The tappet body inner flange 31*a* is formed in a band shape which protrudes toward a center of the tappet body 31 in the inner peripheral surface of the tappet body 31. The communication hole 51 is formed through which the fuel may easily move in an upward and downward direction of the tappet body inner flange 31*a* by removing a portion of the tappet body inner flange 31*a*.

The communication hole 51 is plural in number. Particularly, the communication hole 51 is two in number. In this case, the two communication holes 51 may be arranged at intervals of 180 degrees, and may be formed in a direction perpendicular to a longitudinal direction of the roller 42.

A clearance is formed between the inner peripheral surface of the tappet body 31 and an outer peripheral surface of the roller shoe 41. Since the clearance is formed between the inner peripheral surface of the tappet body 31 and the outer peripheral surface of the roller shoe 41, the fuel supplied to an upper portion of the tappet body 31 may be supplied to a lower portion of the tappet body 31 through the communication holes 51. Thus, the supplied fuel serves as a lubricant and is supplied to the contact portion between the roller 42 and the cam 121.

Here, in order for the fuel to be smoothly supplied to the communication holes 51, each oil supply groove 31*b* may be formed at a portion in which the inner peripheral surface of the tappet body 31 meets the tappet body inner flange 31*a*, particularly, an upper surface side thereof.

Accordingly, as shown in FIG. 5, the fuel supplied to the upper portion of the tappet body 31 is supplied to the contact portion between the roller 42 and the cam 121 by the communication holes 51 formed by removing partial sections of the tappet body inner flange 31*a* and the clearance formed between the outer peripheral surface of the roller shoe 41 and the inner peripheral surface of the tappet body 31, such that the fuel is supplied between the roller 42 and the cam 121 and friction is reduced during contact thereof.

Meanwhile, the lubrication passage may be a roller shoe through hole 52 which is formed in an upward and downward direction of the roller shoe 41, that is, in an operation direction of a plunger 130.

Figure 6:
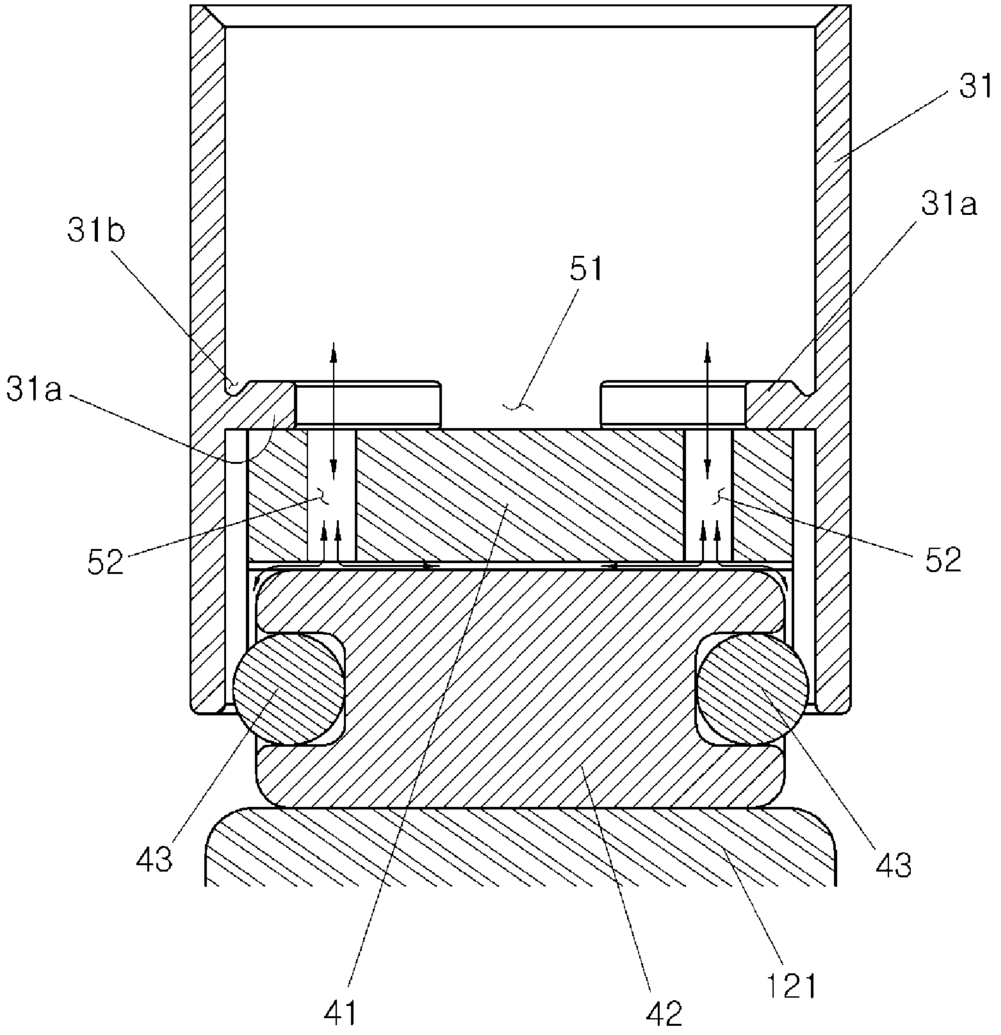
FIG. 6 is a cross-sectional view taken along line 6-6 in FIG. 4 for explaining another lubrication passage in the high pressure fuel pump having improved lubrication characteristics in accordance with the present invention.

As shown in FIG. 6, the roller shoe through hole 52 through which the fuel is moved is formed to be penetrated in an upward and downward direction in an inner portion of the roller shoe 41. The roller shoe 41 is pressed in an inner portion of the tappet body 31, the roller 42 is rotatably installed in the inner portion of the roller shoe 41 through bearings 43, and a lower portion of the roller 42 is exposed to come into contact with the cam 121. Here, the fuel supplied to the high pressure chamber is supplied from an upper portion of the roller shoe 41 through the roller shoe through hole 52 formed in the roller shoe 41 to the contact surface between the roller shoe 41 and the roller 42, such that the fuel may perform lubrication action between the roller shoe 41 and the roller 42.

The roller shoe through hole 52 may be at least one or plural in number in the roller shoe 41.

In this case, the plural roller shoe through holes 52 are arranged in the longitudinal direction of the roller 42 installed in the roller shoe 41. The roller 42 is formed in a cylindrical shape and is mounted to the roller shoe 41. Therefore, the plurality of roller shoe through holes 52 are formed to be arranged in the longitudinal direction of the roller 42 so that the fuel may be supplied in the longitudinal direction of the roller 42.

As above, the fuel serving as a lubricant is supplied by bypassing or passing through the roller shoe 41 or via all of the two paths.

According to the operation of the fuel pump, the fuel is directly supplied to the contact portion between the roller 42 and the cam 121 by passing through the clearance between the tappet body 31 and the roller shoe 41 through the communication hole 51 which is one lubrication passage, or the fuel is also supplied between the roller 42 and the roller shoe 41 through the roller shoe through hole 52 which is another lubrication passage. Therefore, lubrication characteristics may be improved at a friction area, to thereby solve a problem due to abrasion of the friction area.

In the high pressure fuel pump 100 of the related art, the fuel is supplied only by the clearances between the respective components without the passage through which the fuel is easily moved in the upward and downward direction. Accordingly, the lubrication is not smoothly made at the contact areas such as areas between the roller and the cam and between the roller and the roller shoe, thereby causing abrasion or a burning phenomenon as occasion demands.

However, in the above described embodiments, the fuel is sufficiently supplied to the friction area through the plural lubrication passages and is fully filled to serve as a lubricant, thereby improving lubrication characteristics.

In accordance with a high pressure fuel pump having improved lubrication characteristics according to various embodiments of the present invention, fuel flows from an upper portion of a tappet body through a plurality of lubrication passages to a lower portion of the tappet body and is sufficiently supplied around a roller which is a rotating component, thereby allowing lubrication characteristics to be improved by the sufficiently supplied fuel during the operation of the roller. That is, the fuel is sufficiently supplied to a contact portion between the roller and a cam and a contact surface between the roller and a roller shoe, thereby allowing the lubrication characteristics to be improved between the roller and the cam and between the roller and the roller shoe.

In addition, by improvement in the lubrication characteristics of the roller, the fuel serving as a lubricant is sufficiently supplied to drive areas during the operation of the high pressure fuel pump, namely, contact areas of the roller, the roller shoe, and the cam of the cam shaft. As a result, malfunction of the high pressure fuel pump due to incomplete lubrication action may be prevented in advance.

Furthermore, the passage to supply the fuel is divided into two parts and the fuel is directly supplied to the contact area between the roller and the cam and the contact area between the roller and the roller shoe, thereby achieving smooth lubrication characteristics.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A high pressure fuel pump having improved lubrication characteristics, comprising:

a plunger to pressurize fuel supplied to a high pressure chamber formed within a housing at a high pressure to discharge the fuel while being lifted and dropped in the high pressure chamber within the housing;

a tappet body supporting a lower end of the plunger;

a cam to lift and drop the plunger while rotating; and a roller installed in a roller shoe pressed in a lower portion of the tappet body and rotate in a state of being in contact with the cam, wherein the fuel supplied to the high pressure chamber passes the roller shoe through at least one lubrication passage and is supplied to a contact portion between the roller and the cam, a contact surface between the roller shoe and the roller, or the contact portion and the contact surface, wherein the lubrication passage is formed of:

a communication hole which is formed by removing a partial section of a tappet body inner flange formed toward a center of the tappet body in an inner side surface of the tappet body; and a clearance formed between an outer side surface of the roller shoe which is located downward of the communication hole and fitted into a lower portion of the tappet body inner flange and the inner side surface of the tappet body, and wherein the fuel is supplied to the contact portion between the roller and the cam through the communication hole and the clearance.

2. The high pressure fuel pump of claim 1, wherein the communication hole is plural in number.

3. The high pressure fuel pump of claim 1, wherein the communication holes are formed at intervals of 180 degrees and formed in a direction perpendicular to a longitudinal direction of the roller.

4. The high pressure fuel pump of claim 1, wherein an oil supply groove is formed to be recessed at a portion in which the inner side surface of the tappet body abuts against the tappet body inner flange.

5. The high pressure fuel pump of claim 1, wherein the lubrication passage is formed of a roller shoe through hole which is formed to be penetrated in an upward and downward direction of the roller shoe, thereby allowing the fuel to be supplied from upward to downward of the roller shoe, and wherein the fuel is supplied to the contact surface between the roller and the roller shoe through the roller shoe through hole.

6. The high pressure fuel pump of claim 5, wherein the roller shoe through hole is formed from an upper surface of the roller shoe up to the contact surface between the roller shoe and the roller pressed in an inner portion of the roller shoe.

7. The high pressure fuel pump of claim 5, wherein the roller shoe through hole is one or more.

8. The high pressure fuel pump of claim 7, wherein the roller shoe through hole is arranged in a longitudinal direction of the roller.

* * * * *